United States Patent [19]

Allen

[11] Patent Number: 4,787,771

[45] Date of Patent: Nov. 29, 1988

[54] LOADED SUCKER ROD FITTING

[76] Inventor: Loy F. Allen, 4317 Springbrook, Odessa, Tex. 79762

[21] Appl. No.: 942,171

[22] Filed: Dec. 16, 1986

Related U.S. Application Data

[63] Continuation-in-part of Ser. No. 849,497, Apr. 8, 1986, Pat. No. 4,740,101.

[51] Int. Cl.$^4$ .............................. B25G 3/20; F16B 2/00
[52] U.S. Cl. .................................... 403/370; 403/343; 403/267
[58] Field of Search ............... 403/370, 265, 266, 267, 403/343, 296

[56] References Cited

U.S. PATENT DOCUMENTS

| | | | |
|---|---|---|---|
| 1,429,371 | 9/1922 | Shaffer | 403/370 X |
| 3,600,014 | 8/1971 | Harris | 403/370 X |
| 4,585,368 | 4/1986 | Pagan | 403/266 |
| 4,597,688 | 7/1986 | Pagan | 403/265 |

*Primary Examiner*—Andrew V. Kundrat
*Attorney, Agent, or Firm*—Wendell Coffee

[57] ABSTRACT

A sucker rod string using composite rods is provided with socket units. The socket units are all box end units and are connected together with couplers having pin ends. Each of the socket units has a small angle tapered bore. Wedges between the rods and the tapered bore of the socket unit are prestressed by a threaded plug within the box end to a load equal to or greater than the design working load of the string.

9 Claims, 1 Drawing Sheet

LOADED SUCKER ROD FITTING

CROSS REFERENCE TO RELATED APPLICATIONS

This a continuation in part of my previous patent application entitled END FITTING AND COUPLING SYSTEM FOR SUCKER RODS, Ser. No. 06/849,497, filed on Apr. 8, 1986 and now U.S. Pat. No. 4,740,101. The disclosure of that application included herein by reference.

RIGHTS TO INVENTIONS UNDER FEDERAL RESEARCH

There was no federally sponsored research and development concerning this invention.

BACKGROUND OF THE INVENTION (1) Field of the Invention

This invention relates to composite sucker rods for wells and more particularly to fittings and couplings for the sucker rod.

(2) Description of the Related Art

Oil field wells are often over 20,000 feet deep. Sucker rods, which are usually manufactured in lengths of about 25 feet, 30 feet, or 37 feet are joined together by means of coupling to form a rod string which extends the length of the well casing. In a typical well this rod string connects the horse head to the piston in the pump at the base of the well. With each stroke of the piston, oil is forced up to the surface through the annulus between the rod and tubing.

Normally a sucker rod string will be designed of certain material of some certain diameter so that it has a design working load. I.e., the diameter of the rod, the particular alloy of the steel to be used in the fittings and the dimensions of the fitting will all be designed for a particular working load of the string. A typical design working load for a string of this type would be 20,000 pounds. The design working load will vary with many elements, such as well depth and pumping rate.

In recent years, composite rods have been used to form the individual sucker rods of the string. The composite rods exhibit many characteristics which make them superior to steel rods. In using composite rods, the end fittings and the couplings to couple one length of sucker rod to the next have caused problems.

In this specification, the term "composite rods" should not be equated to glass fiber rods. In the technology today the composite rod consists typically of high strength fibers of glass or some other material which are bonded together into a single rod. Those having ordinary skill in the art will recognize that these fibers may be of carbon or aromatic polyarmide (commonly known by Du Pont's Trademark KEVLAR) or other substance. The term "composite rods" is used herein to indicate a manufactured material having high tensile strength.

Normally the sockets and couplings by nature will be larger in diameter than the rods which they connect together. However, it is desirable that they not be excessively large otherwise they will form an obstruction to the flow of fluid (oil) in the annulus between the rod string and the tubing. The limit to which the diameter of the socket and coupling can be reduced is limited inasmuch as normally the strength of the socket and coupling in tension is equal to or greater than the strength of the rod.

The joining of the composite material in rod form to the steel of the socket has been a problem.

Traditionally and according to API (American Petroleum Institute) specifications the sucker rods in oil wells will have a pin on each end of the rod. The rods will be connected together by a coupling unit which is typically less than 12 inches in length and has a box or female connection on each end thereof.

Also the pins are threaded to the sockets. The particular threads by which the pins are threaded to the sockets are designed and called pin threads. Tables are available through the API whereby the total longitudinal force exerted by a given torque upon the threads for any particular diameter of pin and socket is known.

Prior connections of the composite rod to the steel socket included placing the rod directly within the socket, and holding it in place with epoxy. The stretching of the rod led to the breaking up and failure of the epoxy. Subsequently, there would be nothing to hold the rod in place. Its movements would then be erratic. Gluing the rod into the socket directly also made repairs more difficult on either of them.

Prior attempts to hold a composite rod within a tapered sleeve by the use of wedges has met with failure when the wedges were not adhered to the rod. I.e., to attempt to connect the rod within a socket as is shown with steel cable in CARLSON, (identified below) have not been suitable for a composite rod.

Likewise, attempts to insert a composite rod into a socket with a tapered form in the socket and to pour epoxy or other resins or liquid composite material into the blind hole around the rod have not been satisfactory. The main problem has been the inability to form a good bond between the material forming the expansion cone and the rod itself.

The following patents are of record in the parent application identified above.

| U.S. Pats. | |
|---|---|
| BUTLER ET AL | 991,196 |
| SHAFFER | 1,384,489 |
| CLARKE | 1,392,480 |
| TIBBETTS | 2,659,062 |
| HOWARD | 3,168,340 |
| YONKERS | 3,698,749 |
| CARLSON | 4,205,926 |
| SABLE ET AL | 4,249,831 |
| PRIDY | 4,329,124 |
| FISCHER | 4,430,018 |
| PETTERSON ET AL | 4,497,866 |
| French Patents | |
| BESSONNEAU | 1,364,098 |
| PLASTIMO | 2,410,186 |

Applicant believes the Examiner would consider anything of record in the parent application to be relevant and pertinent to the examination of this application. In addition applicant is aware of the PAGAN, U.S. Pat. No. 4,585,368, issued Apr. 29, 1986 on an application filed Sept. 17, 1984.

PAGAN discloses a sucker rod fitting where a plurality of wedges are formed in the socket and inserts are placed between the wedges and the rod. Column 4, line 20 states that the inserts may be fabricated of any suitable material including metal. However, PAGAN prefers molding them of thermoplastic or thermosetting material such as polysulfone, polyethersulfone, polyetherimide or polyphenylene sulfide filled with fibers of glass, graphite, or carbon; or phenolic resin, epoxies, or polyester.

PAGAN also describes that a biasing force may be applied to the wedges to hold them firmly in place while the wedges are adhered to the rod. This biasing force described in column 6, line 22 is approximately 40 pounds. PAGAN in FIGS. 9, 10, and 11 disclose a passage way extending through the pin end of the coupling (PAGAN describes his coupling as having a pin end rather than a socket end). This passage way through the pin end has in it rods with a disk. This disk can be used to press or bear against the inserts with multiple tapers on them to apply the biasing force (about 40 pounds) to the inserts while the adhesive sets.

SUMMARY OF THE INVENTION (1) Progressive Contribution to the Art

I have invented an improved socket unit for sucker rod strings which has a long taper with a small taper angle. An annular wedge or truncated cone fits snugly around the rod and fits smooth to the inside taper. Adhesives are used to adhere the rod to the wedge. The rod, wedge, and socket unit are prestressed by using a threaded plug inside of the threads on the box end or female end of the socket unit. The plug is torqued so that a load or stress equal to or greater than the design working load of the string is applied to the rod, wedge, and the socket unit. The socket unit at the taper will have large hoop or circumferential stress applied through the wedges to the rods even when the rods have a tension applied to them approaching the design working load.

(2) Objects of this Invention

An object of this invention is to provide composite sucker rods for deep wells.

Further objects are to achieve the above with a device that is sturdy, compact, durable, lightweight, simple, safe, efficient, versatile, ecologically compatible, energy conserving, and reliable, yet inexpensive and easy to manufacture, install, operate and maintain.

Other objects are to achieve the above with a method that is versatile, ecologically compatible, energy conserving, rapid, efficient, and inexpensive, and does not require highly skilled people to install, operate, and maintain.

The specific nature of the invention, as well as other objects, uses, and advantages thereof, will clearly appear from the following description and from the accompanying drawing, the different views of which are not scale drawings.

Figure 1:
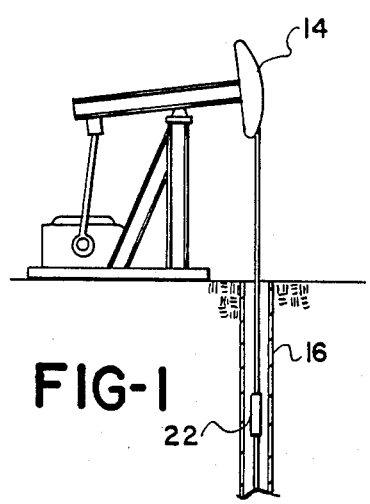
FIG. 1 is a schematic representation of a well with the improved sucker rod string therein.

As an aid to correlating the terms describing this invention to the exemplary drawing the following catalog of elements is provided:

CATALOG OF ELEMENTS 10 string
12 pump
14 horse head
16 eduction tube
18 rods
20 fitting or socket unit
22 coupler
24 pin
26 box threads
28 flange
30 wrench flats
32 coupler end
34 rod end
36 tapered bore
38 plug
40 coupler surface
42 rod surface
44 indentation
46 flange
48 coaxial bore
50 seat
52 wedge
54 out surface
56 bore
58 bevel
60 wrench flat
1 length
a taper angle

DESCRIPTION OF THE PREFERRED EMBODIMENT

Referring to FIG. 1 there is shown a schematic representation of an oil well with sucker rod string 10 according to this invention. The bottom of the string is connected to pump 12 deep below the surface of the earth. The sucker rod string 10 connects the pump 12 to horse head 14 which is means for reciprocating the sucker rod string 10; thereby operating the pump to pump oil to the surface of the ground through eduction tube 16. The string 10 includes a series of composite rods 18. Typically each rod is about 30 feet long. According to this invention, each of the rods will have a socket unit or box end fitting 20 on each end. The box end fittings will be connected by couplers 22.

Each of the couplers 22 will have pin 24 upon each end. The pin will be threaded to mate with box threads 26 on the socket unit 20. The box threads will be standard internal sucker rod pin threads. The coupler 22 will have flange 28 inboard of each pin 24 as is standard for the pin end of sucker rod couplings. Wrench flats 30 will be between the flanges 28. The coupling 22, the fitting 20, and rods 18 will all be of such material and design so that the string 10 will have a design working load.

Figure 2:
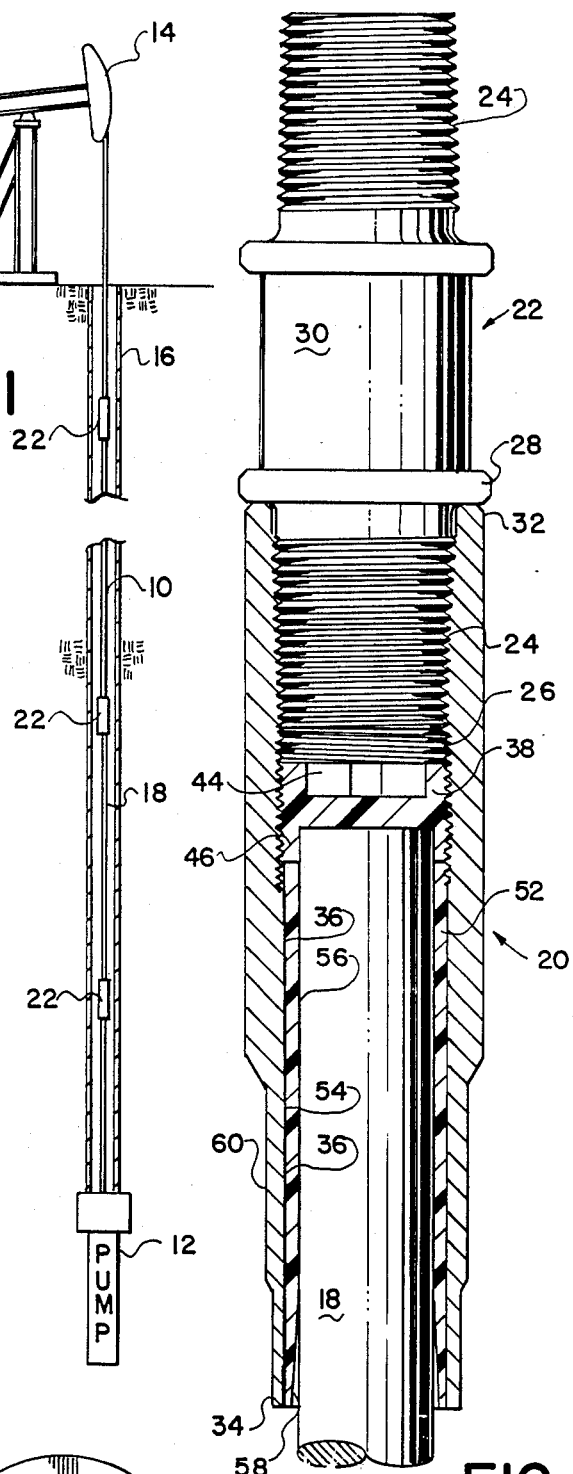
FIG. 2 is a sectional view of an assembled rod, socket unit, and coupler unit.
Figure 4:
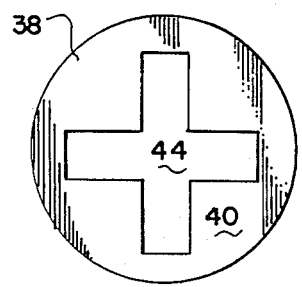
FIG. 4 is an elevational view of the coupler surface of the plug.

The fitting or socket unit 20 will have tubular body having length "1", box or coupler end 32, and rod end 34. Box threads 26 will extend for at least one-third the length of the body from the coupler end. The box threads 26 will terminate at the beginning of tapered bore 36. The tapered bore will extend from the box threads 26 to the rod end 34. The length of the tapered bore 36 will be at least one half the length of the tubular body or socket unit 20. The tapered bore will be a smooth conical surface its entire length. The small or little end of the taper or conic surface of bore 36 will be at the rod end 34. The large or big end of the taper will be at the box threads 26. The diameter of the taper at the large or big end will be the same as the diameter of the box threads 26, as seen in FIG. 2.

Metal plug 38 is threaded into the box threads 26. The plug has two ends or surfaces. Coupler surface 40 is on the surface facing the coupler end 32 and rod surface 42 is the surface facing the rod end 34. The coupler surface will have a noncircular indentation 44. The preferred form is a pair of slots in a cross shape; however, it could be a rectangular or hexagonal cut. The indentation forms rotational drive means in the coupler surface 40 so that the plug 38 may be screwed down as described later. The rod surface 42 has circumferential flange 46. This circumferential flange defines coaxial bore 48. The coaxial bore is about the same diameter as the diameter of the rod 18 so that the rod fits smoothly within the coaxial bore 48 against seat 50. The seat 50 is a flat diametrical surface having a radial face.

Annular wedge or truncated cone 52 is located within the tapered bore 36. The wedge has a length equal to the length of the tapered bore 36. Outer surface 54 of the annular wedge 52 is similar and mates with the inner surface of the tapered bore. The inner bore 56 of the annular wedge 52 is about the same as the outside diameter of the rod 18 so that the annular wedge fits smoothly or snugly to the rod. So the rod and wedge can be readily assembled, a slight taper or bevel 58 is placed on each end of the bore 56 for purposes of assembly. The annular wedge may be made or constructed of any material provided it has sufficient corrosion resistance, temperature tolerance, and shear strength and also is noncompressible. The wedge 52 might be metal such as brass or it might be a composite material similar to that of the rod or it might be an elastomer.

Figure 3:
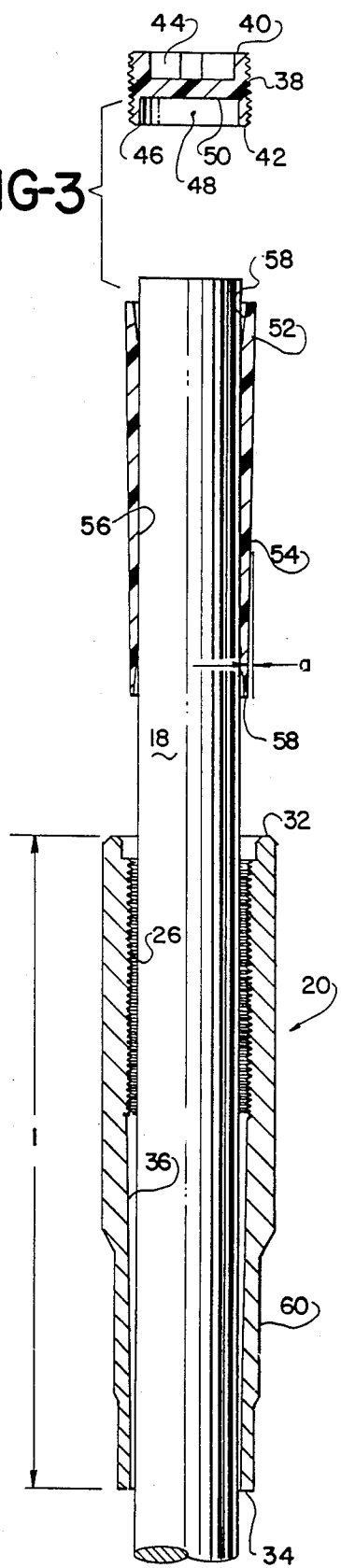
FIG. 3 is a sectional view of the rod and socket unit during assembly.

The annular wedge 52 may contain one or more slits therein so that it can squeeze or grip the rod. As shown in FIGS. 2 and 3, it is preferred to use a very small angle "a" of taper upon the tapered bore 36 and the tapered wedge 52. The preferred taper is 1 to 45. Therefore the sine of the angle of taper will be about 0.022. It will be understood that the sine of the angle will be far below the coefficient of friction between the materials involved. Although the preferred angle is one having a sine of 0.022, larger tapered angles can be used. However, the tapered angle should be such that the sine of the angle is less than 0.03.

A well system designed for composite rods is such that the rods are always in tension. However, the tension will vary with each stroke of the pump. As the tension increases there will be an elongation of the rod 18. This elongation of the rod 18 will cause the cross sectional area of the rod to shrink. Also with the very small taper angle "a" a very large hoop stress or circumferential stress will be placed upon the socket unit between the box threads 26 and the rod end 34. This high circumferential stress will cause a swelling or an increase in diameter of the socket unit. However, all of the elongation, decrease in diameters, increase in circumference will be within the elastic limits of the materials.

According to this invention the plug 38 is screwed down or tightened or torqued a predetermined amount. This predetermined amount is that torque necessary to stress or load the top of the rod 18 and the wedge 52 an amount equal to or above the design working load of the sucker rod string 10. As stated above a typical string design working load is 20,000 lbs.

As indicated above, the analysis of the stresses and strains both longitudinally and circumferentially of the different elements during each stroke of the sucker rod through the action of the horse head 14 is extremely complicated and involved. However, it will be understood that prestressing the rod wedges and the socket unit will reduce or eliminate movement between the rod and the socket. Certainly, at the large end of the tapered bore 36 the rod and wedges will always be in compression inasmuch as they are prestressed by plug 38 to a load which is greater than the design working load.

ASSEMBLY

The socket 20 is assembled upon the rod by telescoping the socket over the rod 18. Before the wedge is positioned on rod adhesive is applied to the rod and if desired to the bore 56 of the wedge. The wedge 52 is telescoped over the rod 18. It will be understood as particularly pointed out in the parent application that the wedge could be formed upon the rod if desired. However, as set out above, the wedge could be previously manufactured of different materials such as metal, composite material, or elastomer. The large end of the wedge would be spaced from the end of the rod by a distance equal to the depth of the flange 46 upon the plug 38.

If desired the exterior of the wedge may have adhesive applied to it. The socket unit is moved toward the wedge so that it is firmly over the wedge. Then the plug 38 is inserted into the socket unit box threads 26 and threaded down. It will be noted that the end of the rod 18 fits within the bore 48 of the plug 38. This will center the rod so that the rod is coaxial with the plug and with the socket unit 20. Also the end of the rod 18 is seated against the radial face 50 of the plug 38 so that the exact length of the rod unit is controlled. Then the plug is screwed down or torqued down by a tool in the rotational drive means 44 in the coupler surface 40 and torqued down to a torque resulting in a compressional stress which is equal to or greater than the design working load. It will be understood that there will be a compressional stress between the plug on one side and the rod and wedge on the other. Force is equal to compressional stress. With this compressional stress applied, the fitting can be heated sufficiently to set the adhesive or otherwise treat it. The socket unit and rod are held in fixed position during this time. It will be understood that the compressional stress having once been applied is maintained upon the end of the rod and wedges until the adhesive has set and while the string 10 is in service.

The embodiment shown and described above is only exemplary. I do not claim to have invented all the parts, elements, or steps described. Various modifications can be made in the construction, material, arrangement, and operation, and still be within the scope of my invention.

The restrictive description and drawing of the specific examples above do not point out what an infringement of this patent would be, but are to enable one skilled in the art to make and use the invention. The limits of the invention and the bounds of the patent protection are measured by and defined in the following claims.

I claim as my invention:

1. A metal socket unit for a composite sucker rod comprising:
   a. a tubular body having
      i. a length,
      ii. a coupler end, and
      iii. a rod end,
   b. standard internal sucker rod pin threads for at least one third the length of the body at the coupler end, c. a tapered bore for at least one half the length of the body, said tapered bore having
  i. a big end and
  ii. a little end
d. the tapered bore beginning at the pin threads with the big end, the big end being the same diameter as the diameter of the threads,
e. the tapered bore having a smooth conical surface to the little end at the rod end, and
f. a metal plug threaded in the internal pin threads,
g. a circumferential flange around a coaxial bore having a radial face in the surface of the metal plug facing the rod end, and
h. rotational drive means in the surface of the plug facing the coupler end.

2. The invention as defined in claim 1 further comprising:
j. said tapered bore and an annular wedge in the tapered bore having the same taper angle which is an angle having a sine of less than 0.03.

3. The invention as defined in claim 1 further comprising:
j. a composite rod having a design working load coaxial with the tubular body and extending from the rod end to the bore in the plug,
k. said rod fitting smoothly in the bore, and
l. an annular wedge around the rod in the tapered bore, tightly contacting both the rod and tapered bore for most of its length,
m. the annular wedge jammed tightly against the circumferential flange of the plug and the rod jammed tightly against the radial face of the bore of the plug so that the force on the plug is at least as large as the working load of the sucker rod.

4. The invention as defined in claim 3 further comprising:
n. a socket unit as defined above upon each end of said rod.

5. The invention as defined in claim 4 further comprising:
o. a string of rods as defined above with the rods made up with couplers,
p. each coupler having a pin upon each end threaded in the pin threads of the socket unit.

6. The invention as defined in claim 5 further comprising:
q. said tapered bore and said annular wedge having the same taper angle which is an angle having a sine of less than 0.03.

7. In a string of composite sucker rods in a well extending from
a. a pump deep within the earth to
b. a means for reciprocating the string attached thereto above the surface of the earth,
c. said string having a design working load;
d. an improved socket unit on each rod comprises:
e. a tubular body having
  i. a length,
  ii. a coupler end, and
  iii. a rod end,
f. standard internal sucker rod pin threads for at least one third the length of the body at the coupler end,
g. a tapered bore having a big end and a little end for at least one half the length of the body at the rod end,
h. the tapered bore beginning at the pin threads with the big end, the big end being the same diameter as the diameter of the threads,
i. the tapered bore having a smooth conical surface to the little end at the rod end, and
j. a metal plug threaded in the internal pin threads,
k. the metal plug having a circumferential flange around a coaxial bore having a radial face in the surface facing the rod end, and
l. rotational drive means in the surface facing the coupler end,
m. a composite rod coaxial with the tubular body and extending from the rod end to the bore in the plug,
n. said rod fitting snugly in the bore, and
o. an annular wedge around the rod in the tapered bore, tightly contacting both the rod and tapered bore for most of its length,
p. the annular wedge jammed tightly against the circumferential flange of the plug and the rod jammed tightly against the radial face of the bore of the plug so that the force on the plug is at least as large as the design working load of the sucker rod string.

8. The invention as defined in claim 7 further comprising:
q. a socket unit as defined above upon each end of said rod,
r. a plurality of couplers, each coupler having a pin upon each end threaded in the pin threads on the coupler end of the socket unit.

9. The invention as defined in claim 7 further comprising:
q. said tapered bore and said annular wedge having the same taper angle which is an angle having a sine of less than 0.03.

* * * * *